Sept. 15, 1953 E. G. DOKE 2,651,819
ADJACENT FLOOR AND THRESHOLD PLATE STRUCTURE FOR RAILWAY CARS
Filed Feb. 20, 1951 2 Sheets-Sheet 1
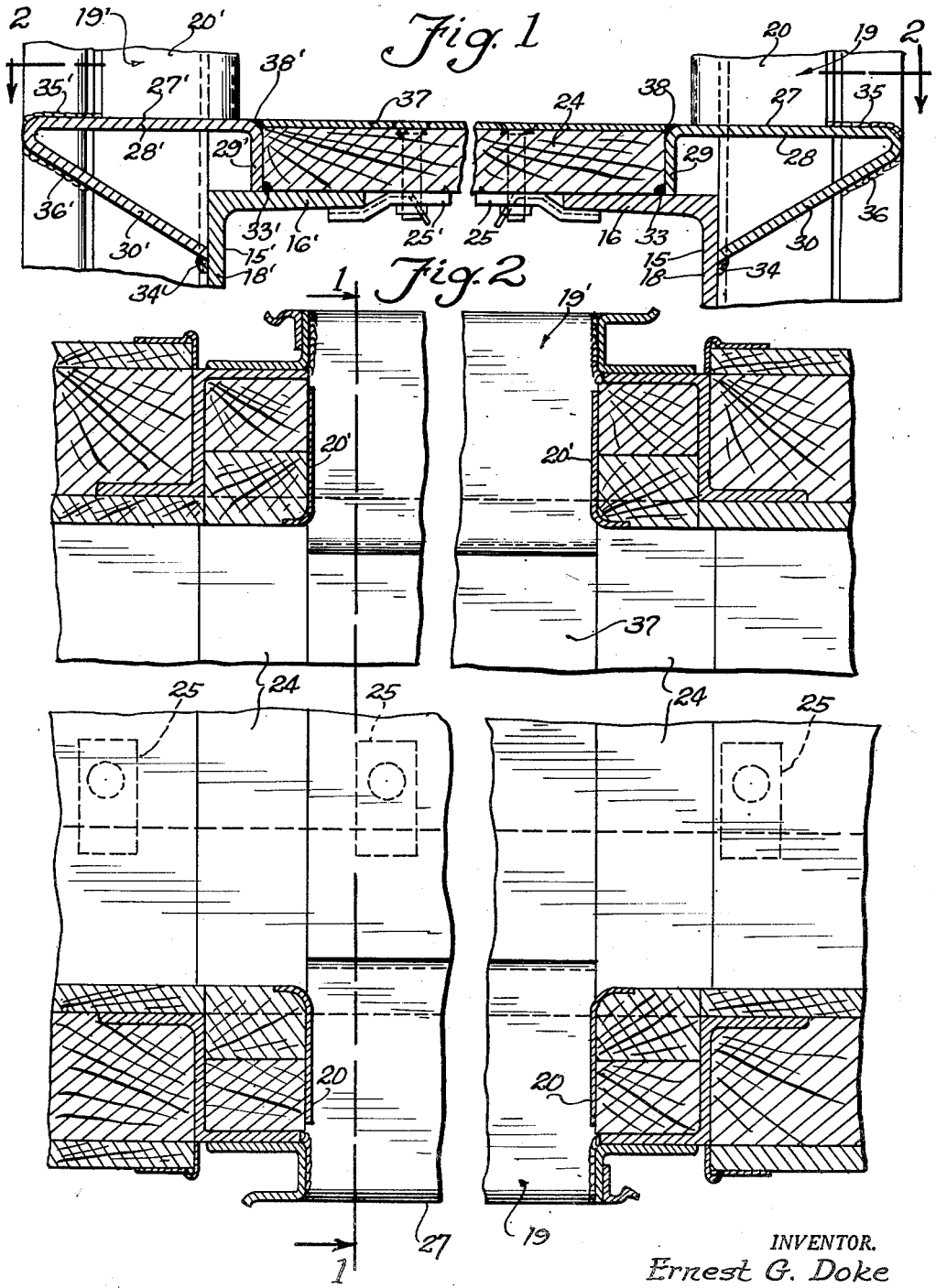
INVENTOR.
Ernest G. Doke
BY Albert G. McCaleb
Attorney Sept. 15, 1953            E. G. DOKE            2,651,819
ADJACENT FLOOR AND THRESHOLD PLATE STRUCTURE FOR RAILWAY CARS
Filed Feb. 20, 1951            2 Sheets-Sheet 2
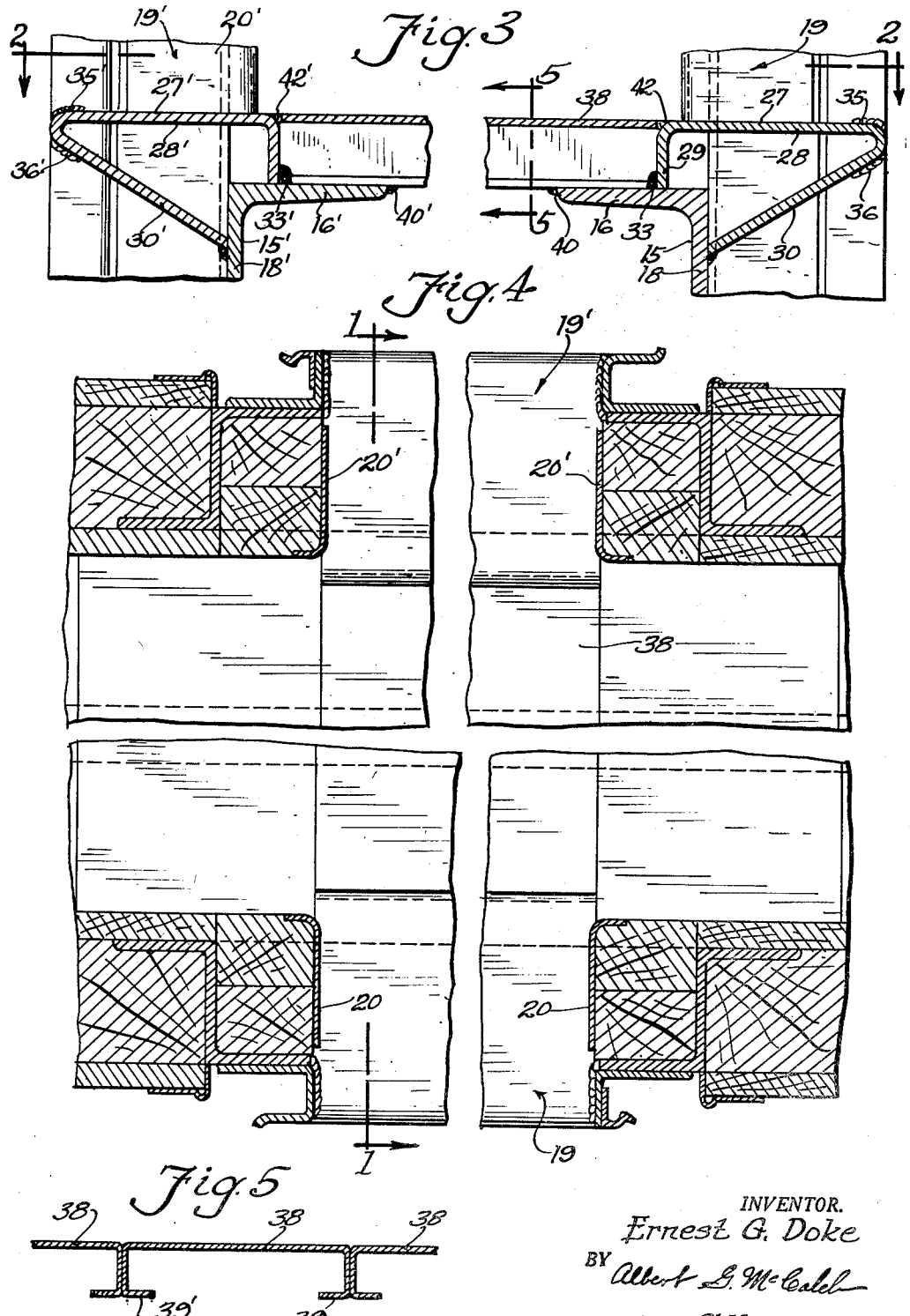
INVENTOR.
Ernest G. Doke
BY Albert G. McCaleb
Attorney Patented Sept. 15, 1953

2,651,819

UNITED STATES PATENT OFFICE 2,651,819

ADJACENT FLOOR AND THRESHOLD PLATE STRUCTURE FOR RAILWAY CARS

Ernest G. Doke, Winnetka, Ill., assignor to Mac-Lean-Fogg Lock Nut Company, Chicago, Ill., a corporation of Illinois Application February 20, 1951, Serial No. 211,900

4 Claims. (Cl. 20—64)

This invention relates to adjacent floor and threshold plate structure adapted to use in railway freight cars, and more particularly to car floor and threshold plate combinations adapted to use at the doorways of freight cars to promote both strength and the ability to withstand the hard wear and abuse to which that portion of a car structure is subjected.

This application is a continuation in part of my copending application for United States Letters Patent, Serial No. 654,545, filed March 15, 1946, now Patent No. 2,543,402 issued February 27, 1951, and entitled Threshold Plates for Railway Cars.

In addition to the fact the door openings somewhat weaken the structure of freight cars at the mid-portions thereof, there is the additional fact that all of the lading carried by a freight car is loaded into the car and removed from it over the threshold plates and the portion of the floor between the doors. Thus, it is particularly desirable that the between-the-door floor portion and the threshold plates shall not only promote rigidity of the car structure at the doors, but that the threshold plates and adjacent floor shall present a smooth surface and withstand the wear and abuse which are incident to freight loading.

It is therefore a general object of this invention to provide adjacent floor and threshold plate structures which complement and supplement one another to establish a smooth car loading and unloading surface which is capable of withstanding hard wear.

Another object of my invention is to provide adjacent floor and threshold plate structure for use in freight cars wherein the threshold plates rigidify the car side sill structures longitudinally of the car at the door opening, and the floor intervening between the opposed threshold plates not only forms therewith a flush and smooth surface, but also embodies a rugged metal top surface anchored to the opposed threshold plates by welded seams.

Considered more specifically, one aspect of my invention comprehends the provision of formed metal threshold plates secured to the car side sill and having a height such that a metal plate placed on top of wood flooring and extending between the opposed threshold plates is substantially flush with the threshold plates; the metal plate being secured to the threshold plates by welding, thereby to anchor the opposite sides of the metal plate and provide a tie between the threshold plates laterally of the car.

In an additional specific aspect, my invention has within its purview the provision of threshold plates in opposed relationship laterally of a freight car and secured to the car side sill so as to extend above the side sills and provide reinforcements of tubular section extending across the door openings of the car, and there being further provided flooring of channel section extending laterally of the car between the threshold plates and welded thereto with the top surface of the flooring in substantially flush relationship to the top webs of the threshold plates.

Other objects and advantages of the invention will be apparent from the following description and the accompanying drawings in which similar characters of reference indicate similar parts throughout the several views.

Referring to the drawings, of which there are two sheets:

Fig. 1 is a fragmentary vertical section taken transversely of a standard railway freight car equipped with threshold plates and adjacent floor structure embodying a preferred form of my invention, the section being taken at the lower portion of the doorway and substantially at the position indicated by a line I—I in Fig. 2;

Fig. 2 is a fragmentary plan view of the structure depicted in Fig. 1, with parts of the railway car structure shown in section, the section, in this instance, being taken substantially on a line 2—2 of Fig. 1;

Figs. 3 and 4 are views similar to Figs. 1 and 2 respectively, which illustrate a modification of my invention to adapt it to the use of a different type of flooring than that illustrated in Figs. 1 and 2; and Fig. 5 is a fragmentary sectional view taken substantially on a line 5—5 of Fig. 3 and further illustrates the type of flooring utilized in the form of the invention depicted in Figs. 3 and 4.

In the two exemplary embodiments of my invention which are herein disclosed for illustrative purposes, I have illustrated the applications of both forms of my adjacent floor and threshold plate structure to the same standard type of railway freight car, so that the description of the general freight car structure applies to all of Figs. 1, 2, 3 and 4. In those figures also, the disclosed portions of the railway car structure include those at and between the opposed doorways of a box car.

In the illustrated freight car structure, through running side sills 15 and 15' extend longitudinally along opposite sides of the car and have upper flange portions 16 and 16' which extend inwardly of the car structure from integral webs 18 and 18'. Substantially aligned side doorways 19 and 19' on opposite sides of the car are defined longitudinally of the car by opposed and spaced door posts 20 and 20' which extend upwardly from positions along the outer surface of the web portions 18 and 18' of the side sills 15 and 15'. The doors (not shown), as well as the side wall and sheathing construction of the car are of types generally known in railway car construction.

Threshold plates 27 and 27', in the form herein depicted, include top webs 28 and 28', inner vertical flanges 29 and 29' and inwardly and downwardly extending outer flanges 30 and 30' all of which are desirably formed integrally by the bending of sheet metal stock. In their mounted positions, the substantially plane upper surfaces of the top webs 28 and 28' are horizontal longitudinally and transversely of the car. The lengths of the threshold plates are such that they fit between the door posts 20 and 20', while the widths are such that they overlap an outer side portion of the side sill and extend outwardly thereof to the outer surfaces of the door post structures.

For securing the threshold plates 27 and 27' in place, I prefer welded seams such as 33 and 33', along the inner edges of the vertical inner flanges 29 and 29' of the threshold plates and the upper side sill flanges 16 and 16'. Also, the downwardly and inwardly extending outer flanges 30 and 30' of the threshold plate are disposed in acute angular relationship to their respective top webs 28 and 28' and have end surfaces which abut and are welded to the outer surfaces of the side sill webs 18 and 18' below the general plane of the upper side sill flanges 16 and 16', as depicted at 34 and 34'. To further strengthen and mutually brace the threshold plates and adjacent parts of the car structure, I prefer to weld the outer end portions of the top webs 28 and 28' and the outer flanges 30 and 30' to the outer post structure as shown at 35, 35', 36 and 36' respectively. In the illustrated embodiments of my invention, the welded seams 33, 33', 34 and 34' serve securely to hold and support the threshold plate. These welded seams may be continuous or intermittent to provide joints such that a laterally closed tubular reinforcing structure extends longitudinally of the side sill at the door opening. Such reinforcement is particularly desirable at the door opening because of its usual location near the mid-portion of the side sill span and because of the lack of other reinforcement, such as the car side frame, at the door opening.

Having reference to the structural embodiment of my invention which is depicted in Figs. 1 and 2, wood floor boards 24 extend laterally of the car and have opposite end portions resting upon the inwardly projecting and exposed surfaces of the upper side sill flanges 16 and 16'. Opposite ends of the floor boards 24 abut the inner vertical flanges 29 and 29' of the threshold plates. Each of the floor boards is secured in place by floor board clips 25 and 25', which clips are bolted to the floor boards and have end portions underlying the inner margins of the upper side sill flanges 16 and 16'.

Since all of the lading loaded into and removed from the car is moved over the floor boards at and adjacent the doorways, my disclosed structure embodies a metal plate 37 of substantially the length of the threshold plates and covering the entire floor area between the threshold plates 27 and 27'. The thickness of the wooden floor boards covered by the plate 37 is such that the top surface of the plate, when placed thereon, is flush with the top surfaces of the webs of the threshold plates 27 and 27'. Furthermore, in my disclosed structure, the opposite side edges of the plate 37 are welded to the threshold plates by seams 38 and 38'. The plate 37 being flush with the threshold plate webs, and the opposite sides of the plate being welded to the threshold plates, the loading surface is not only smooth, but the plate forms a tie between the threshold plates contributing rigidity to the structure. Additionally, the welding of the opposite sides of the plate to the threshold plates affords a secure anchor for the plate, so that it cannot be scuffed-up during loading operations. Quite obviously, the metal floor plate presents a wear-resisting surface adapted to withstand the wear and abuse which accompanies loading and unloading operations.

In the modification of my invention which is depicted in Figs. 3, 4 and 5, the car floor between the doorways is made up of metal flooring pieces 38 comprising formed sections of substantially channel shape, as shown in Fig. 5. As depicted in Fig. 3, and as in the instance of the use of wood floor boards, the flooring pieces 38 have end portions which rest upon the upper surfaces of the side sill flanges 16 and 16'. Also, the opposite ends of the flooring pieces abut the inner vertical flanges 29 and 29' of the threshold plates. Preferably, the flooring pieces 38 each have inwardly extending lower lips 39 and 39' which rest upon the side sill flanges and are secured thereto by welded seams 40 and 40'. The flooring pieces 38 are of a height such that they are flush with the top web surfaces of the threshold plates and are secured at their opposite ends to the threshold plates by welded seams 42 and 42'. Thus, the metal flooring pieces present advantages in the disclosed structural combination which are comparable to those outlined in respect to the wooden floor boards covered by the metal plate 37.

From the foregoing description and reference to the accompanying drawings, it may be understood that I have provided adjacent floor and threshold plate structure for use at the doorways of box cars and the like which not only affords a smooth loading surface, but which also provides ruggedness for withstanding wear and abuse, as well as adding strength to the car structure.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a railway car having side sills extending longitudinally of opposite sides of the car and each comprising a web portion and an integral flange extending inwardly of the car from the top of the web portion, and door posts extending upwardly in spaced relationship from each of the side sills to define door openings on opposite sides of the car; the combination therewith of a threshold plate of formed metal section for each door opening and having a top web portion, an inner flange extending downwardly in substantially right angular relationship from the top web portion, and an outer flange extending inwardly and downwardly from the top web portion in acute angular relationship thereto, each threshold plate being secured to the upper and outer surfaces of one of the side sills by having the lower edge of the inner flange and the inner edge of the outer flange welded to the mid-portions of each of the top flange and web portion respectively of the side sill so that the web portion of the threshold plate is above the side sill flange and the inner flange of the threshold plate provides a floor abutment, said threshold plates also having their opposite ends secured to the door posts and forming with the side sills a hollow and tubular reinforcing structure extending across the door opening, and a metal floor extending between the threshold plates in spaced relationship to the side sill flanges and having its ends welded to each of the threshold plates at the juncture of the web portion and inner flange thereof.

2. In a railway car, the combination defined in claim 1, and further characterized by a floor reinforcement extending across the under side of the metal floor from the inner flange of one threshold plate to the inner flange of the other and having its opposite ends supported by the side sill flanges.

3. In a railway car, the combination defined in claim 2, and wherein said floor reinforcement comprises wood flooring of a thickness somewhat less than the height of the inner flanges on the threshold plates.

4. In a railway car, the combination defined in claim 1, and wherein the metal floor comprises a plurality of channels opening downwardly and extending in adjacent side-by-side relationship between inner flanges of the threshold plates, said channels having web portions in the general plane of the web portions of the threshold plates and side flanges engaging and secured to the flanges of the side sills.

ERNEST G. DOKE.

References Cited in the file of this patent

UNITED STATES PATENTS

| Number | Name | Date |
| --- | --- | --- |
| 793,823 | Christianson | July 4, 1905 |
| 2,313,167 | Nystrom | Mar. 9, 1943 |
| 2,387,226 | Bonsall | Oct. 23, 1945 |